March 7, 1933.  O. A. WENBERG  1,900,213
GRAIN HANDLING DEVICE
Filed Aug. 2, 1930  2 Sheets-Sheet 1

Inventor:
Oscar A. Wenberg.
By
Jones, Addington, Ames & Seibold.
Attorneys.

March 7, 1933. O. A. WENBERG 1,900,213
GRAIN HANDLING DEVICE
Filed Aug. 2, 1930 2 Sheets-Sheet 2
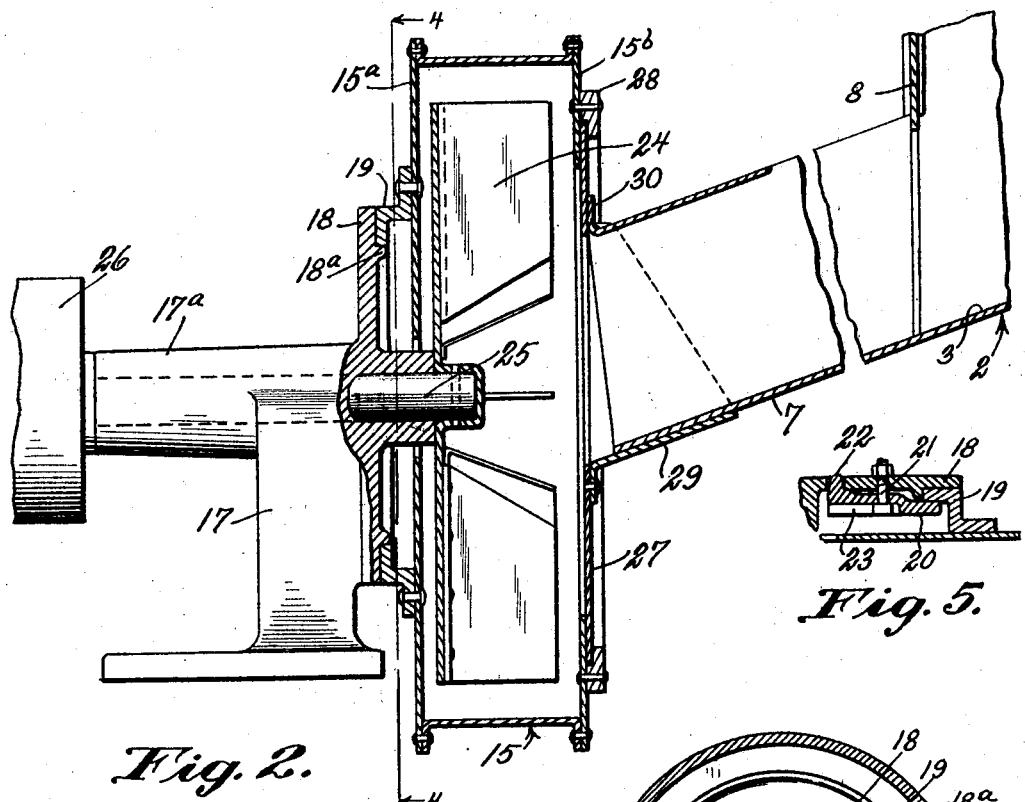
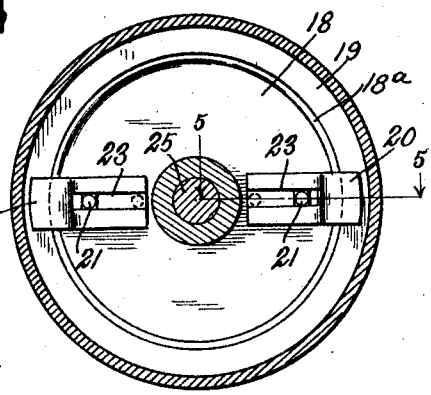
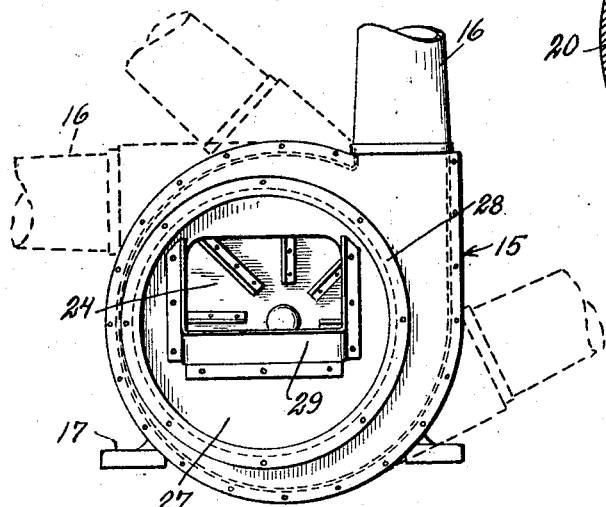
Inventor:
Oscar A. Wenberg.
By
Jones, Addington, Ames & Seibold,
Attorneys.

Patented Mar. 7, 1933

1,900,213

UNITED STATES PATENT OFFICE

OSCAR A. WENBERG, OF BATAVIA, ILLINOIS, ASSIGNOR TO UNITED STATES WIND ENGINE & PUMP COMPANY, OF BATAVIA, ILLINOIS, A CORPORATION OF ILLINOIS

GRAIN HANDLING DEVICE

Application filed August 2, 1930. Serial No. 472,730.

My invention relates to grain blowers, and more particularly to grain blowers provided with a hopper for receiving the grain from wagons or trucks delivering the grain to various heights and in various directions.

My invention contemplates the use of a hopper for delivering the grain to a suitable blower, provision being made so that the hopper is adjustable to receive the grain from wagons or trucks of different floor heights. The invention is especially adapted for receiving the grain and loading it into cars for shipment or in bins for storage. It is also adaptable for cleaning and drying the grain by elevating it through the blower and a suitable outlet pipe at the time of threshing.

It is an object of the invention to provide a blower having a suitable outlet pipe, which latter may be swiveled to any desired angular position where it may be secured in place and whereby the device may be used if desired without the necessity of an elbow on the outlet pipe.

A further desirable feature is the provision of a grain blower in which the hopper is provided with self adjusting hinged sides which fit closely underneath the end of the wagon box, thus preventing the spilling of the grain, and whereby the wagon may deliver the grain from either side of the hopper.

The hopper may be easily and quickly removed from the blower, and is easily replaced after the wagon is in position, thus eliminating the necessity of backing the load.

An adjustable gate associated with the hopper chute keeps the amount of grain entering the blower under the control of the operator at all times and allows a greater or less flow as required for efficient operation with various kinds and conditions of grain.

Present methods of farming necessitate reduced labor costs and economical methods of handling grain. My invention provides a simple and efficient device whereby a single operator may handle the grain from the separator to the granary in the cheapest manner and under all conditions, and may set up or take down the device in a few minutes.

Other objects and advantages of the invention will appear from a consideration of the following detailed description in conjunction with the accompanying drawings, in which:

Fig. 2 is a longitudinal detailed view, partially in section, through the blower and a portion of the hopper;

Fig. 3 is a front view of the blower with the hopper removed and illustrates the angular adjustment of the blower outlet;

Fig. 4 is a transverse section taken substantially on line 4—4 of Fig. 2 and illustrates the clamping means for securing the adjusted blower outlet in position; and Fig. 5 is a detailed sectional view of the clamping means taken on the line corresponding to line 5—5 of Fig. 4.

Figure 1:
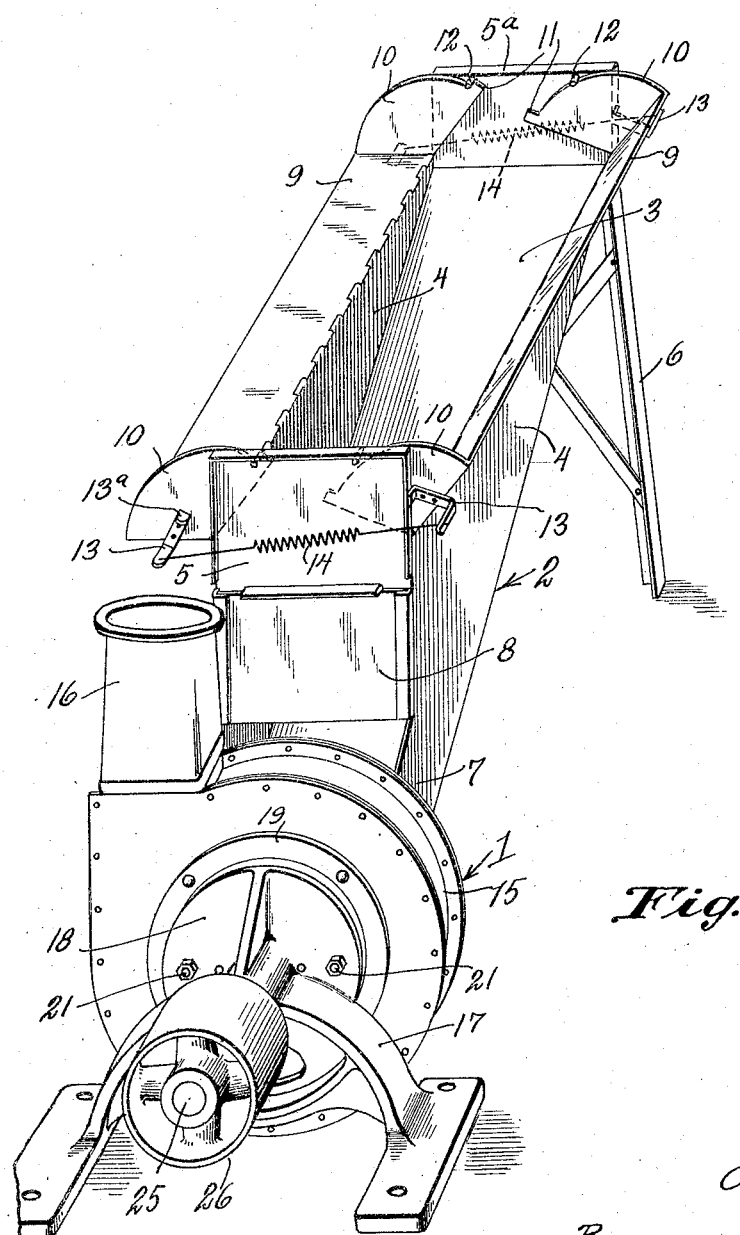
Figure 1 is a perspective view of one embodiment of my invention.

Referring to the drawings in detail, the embodiment illustrated comprises a rotary fan blower 1 and associated hopper 2, by which the grain is transferred to the blower. The hopper 2 is preferably of sheet metal and provided with an inclined floor 3, side walls 4 and end walls 5 and 5a. Suitable legs 6 support the outer end of the hopper, the forward end terminating in a chute 7, through which the grain is transferred by gravity from the hopper to the blower. A control gate 8 is slidably mounted in a position to control the flow of grain through the chute 7 and may be adjusted to any desired position, where it is retained by friction. Each side of the hopper 2 is provided with a hinged section 9, which is so constructed and attached to the hopper that it may be moved from a horizontal to an upwardly inclined position and thereby be adjustable to receive wagon or truck boxes of different floor heights between the end walls of the hopper. The ends 10 of the hinged sections are turned inwardly, thereby keeping the ends of the hopper closed at all times, the inwardly extending lugs 11 cooperating with stop pins 12 on the end walls when the inclined portions are in a horizontal position.

Attached to each end of each hinged section is a bracket 13 to which the springs 14 are secured. The brackets 13 also provide stops 13a for the inclined members when they are in raised position. The brackets to which the springs 14 are secured are so arranged that when either or both of the hinged sections are in lowered position the spring passes below the dead center of the hinges, thereby causing the hinged sections to remain in either the raised or lowered adjusted position.

It will be noted that with the hinged section lowered to the horizontal position, the wagon may be backed up until the end of the wagon box extends over the hopper and between the ends thereof. The section may then be raised and will be held against the bottom of the wagon box and prevent spilling of the grain. As the springs 14 retain the sections pressed upwardly in all positions, except the horizontal, they will be self-adjusting to various heights of the wagon box.

The blower by which the grain may be elevated comprises a cylindrical housing 15, having an outlet pipe 16, to which latter may be connected any suitable blower pipe for conveying the grain to a distance. A supporting frame 17 is provided with a flange 18 on which the housing is rotatably mounted by means of a concentric ring 19 secured to the side plate 15a of the housing.

The ring 19 is guided concentrically on the flange by a concentric rib 18a and is clamped against the flange in any adjusted position by clamp members 20, which latter are locked in clamped position by bolts 21 extending through the flange 18. Lugs 22 extend through the locating holes in the flange 18 and the head of the bolt is engaged in a slot 23, thereby preventing the bolt from turning during the clamping operation. By this means the clamping member 20 is securely clamped against the concentric ring 18, thereby locking the blower in the desired adjusted position. A fan 24 is secured to a shaft 25 which latter is mounted in a suitable bearing 17a on the frame and is provided with a driving pulley 26.

The blower inlet is eccentric with the blower housing and comprises a circular sheet metal plate 27, which is mounted for free rotation in a grooved ring 28 secured to the face 15b of the blower housing 15. An outwardly extending chute supporting flange 29 is secured to the rotatable disc 27 and is arranged to receive and support the end of the hopper chute 7.

As illustrated in Fig. 2, an upwardly extending flange 30 rests against the plate 27 and retains the hopper chute in position in the locating flange 29. The eccentric position of the blower inlet (Fig. 3) is found to be most effective for the efficient operation of the device and the free rotary mounting of the inlet member allows a free movement parallel to the blower housing whereby the chute 7 which supports the grain hopper may be held in operative position regardless of the adjusted position of the blower housing and the housing may be rotated by loosening the clamps 20 and rotating the entire housing to move the outlet pipe 16 to any desired angular position, in which position it may be secured by tightening the clamps.

The embodiment shown may be modified without departing from the spirit of the invention, and I desire to be limited only by the prior art and the appended claims.

Having thus described my invention, what I claim and desire to secure by Letters Patent is:

1. A grain handling device comprising a centrifugal blower fan, a blower casing for said fan, a discharge conduit leading from said casing, a shaft for the blower fan, a bearing bracket for said shaft having a swivel connection with one side of the fan casing, an open-top inclined gravity inlet chute having a swivel connection with the other side of the fan casing, and a support secured to the chute for holding it in inclined position, whereby the bearing bracket supports one side of the fan casing and the chute supports the other side of the fan casing and whereby the fan casing is suspended by and swiveled between the supporting bracket and the supporting chute.

2. A grain handling device comprising a centrifugal blower fan, a blower casing for said fan, a discharge conduit leading from said casing, a shaft for the blower fan, a bearing bracket for said shaft having a swivel connection with one side of the fan casing, an open-top inclined gravity inlet chute having a swivel connection with the other side of the fan casing, and a support secured to the chute adjacent the end remote from the fan casing for holding it in inclined position, whereby the bearing bracket supports one side of the fan casing and the chute supports the other side of the fan casing and whereby the fan casing is suspended by and swiveled between the supporting bracket and the supporting chute.

In witness whereof, I have hereunto subscribed my name.

OSCAR A. WENBERG.